Patented Mar. 8, 1938

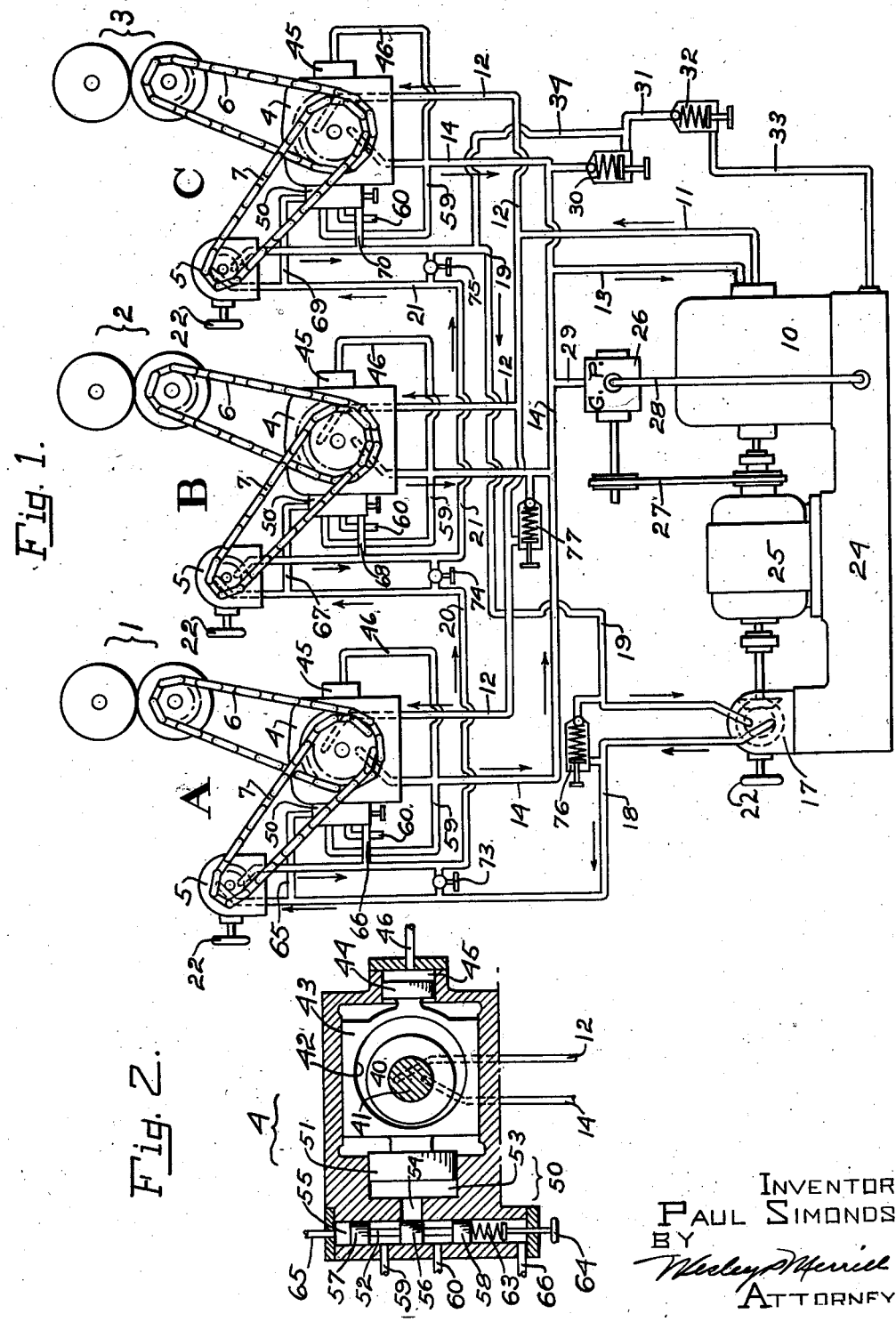

2,110,428

UNITED STATES PATENT OFFICE 2,110,428

SECTIONAL DRIVE

Paul Simonds, Milwaukee, Wis., assignor to The Oilgear Company, Milwaukee, Wis., a corporation of Wisconsin Application July 6, 1936, Serial No. 89,039

17 Claims. (Cl. 60—53)

This invention relates to drives of the type employed to drive a group of related machines or the several units or sections of a single machine, such as a paper machine, printing press or the like. The torque required to start such a machine or group of machines is often as much as twice the running torque so it is ordinarily necessary to drive the same from a power plant having a capacity considerably in excess of the power required to keep the machine or group of machines running after being started.

The present invention has as an object to provide a sectional drive which will maintain the speeds of the several machines or machine units driven thereby proportional to each other.

Another object is to provide a drive in which a plurality of hydraulic motors may be driven by liquid supplied thereto from a single source and the speeds of the several motors maintained proportional to each other.

Another object is to provide a drive which may be adjusted to vary the speed of one or more of its sections relative to the speed of one or more other sections in order to provide draw between adjacent machines or machine units driven thereby.

Another object is to provide a sectional drive which will enable a prime mover to drive a group of machines or machine units at proportional speeds and which may be adjusted to vary the overall speed of the group without changing the ratio between the speeds of the individual machines or machine units and without varying the speed at which the drive is driven by the prime mover.

Another object is to provide a sectional drive which will permit a group of machines or machine units to be started and driven by a power plant of considerably smaller capacity than the power plant heretofore required to start and drive a similar group of machines or machine units.

Other objects and advantages will appear from the description hereinafter given of a hydraulic drive in which the invention is embodied.

According to the invention in its general aspect, the drive is divided into several sections each of which includes a variable displacement hydraulic motor and a hydraulic helper motor which are mechanically synchronized, all the helper motors are hydraulically connected in series and supplied with motive liquid from a single source, the variable displacement motors are supplied with motive liquid from a different source, and each variable displacement motor has its displacement varied in response to variations in the drop in pressure across its helper motor.

The invention is exemplified by the drive shown schematically in the accompanying drawing in which the views are as follows:

Fig. 1 is a diagram of the hydraulic circuit and shows the relation between the several parts of the drive.

Fig. 2 is a section through one of the motors, the view being somewhat diagrammatic in character and showing the displacement varying mechanism considerably enlarged in respect to the motor.

The drive may be provided with any number of sections but, for the purpose of illustration, it has been shown provided with three sections A, B, and C to drive, respectively, three related machines or three units 1, 2, and 3 of a single machine.

Each drive section includes a variable displacement hydraulic motor 4 and a second hydraulic motor 5 which are mechanically connected to each other and to the machine to be driven. Motor 4 has been designated as the "main" motor and shown as being considerably larger than motor 5 which has been designated as a "helper" motor but such proportions are not necessary for the reason that the two motors may be of the same or of different sizes as long as neither motor is capable of driving both the machine and the other motor.

The motors of each section may be connected in any suitable manner to each other and to the machine to be driven by that section, as by means of a drive 6 which connects motor 4 to the machine and a drive 7 which connects motor 5 to motor 4.

Liquid for driving all of motors 4 is supplied thereto from a common source such as a pump 10 of the constant pressure type. Such a pump has the characteristic of delivering liquid at its full volumetric rate until pump pressure reaches a predetermined maximum and then automatically reducing its displacement until it is delivering just sufficient liquid to maintain that maximum pressure substantially constant. Since pumps of this character are well known and in extensive use, no further description thereof will be given.

Pump 10 delivers its output through a channel 11 into a supply channel 12 having three branches each of which is connected to the intake port of a motor 4. Liquid is returned to pump 10 from motors 4 through a return channel 13 which connects the intake of pump 10 to a return channel 14 having three branches each of which is connected to the outlet of a motor 4. All of the motors 4 are thus connected to pump 10 in parallel with each other.

Liquid for operating motors 5 is supplied thereto by a variable displacement pump 17 which has its outlet connected to the inlet of motor 5 of section A by a channel 18 and its inlet connected to the outlet of motor 5 of section C by a channel 19. The outlet of motor 5 of section A is connected by a channel 20 to the inlet of motor 5 of section B which has its outlet connected by a channel 21 to the inlet of motor 5 of section C. All of motors 5 and pump 17 are thus connected in series with each other and each is preferably provided with means for varying the displacement thereof, such as the stroke changing mechanism shown in Patent No. 1,998,984 and indicated in Fig. 1 by a hand wheel 22.

Pumps 10 and 17 are shown as being arranged upon a base 24 and driven in unison by an electric motor 25 arranged thereon. Base 24 may be hollow and contain a supply of liquid for pumps 10 and 17.

Liquid for supercharging pumps 10 and 17 and for control purposes is supplied by an auxiliary pump such as a gear pump 26 which may be incorporated in one of the pumps and driven in unison therewith according to the usual practice but which has been shown as being driven by motor 25 through a drive 27.

Gear pump 26 has its intake connected by a channel 28 to the interior of base 24 and its outlet connected by a channel 29 to channel 14 intermediate the ends thereof. Liquid discharged by gear pump 26 in excess of the volume required for control purposes and to make up for leakage losses is discharged through a suitable resistance to enable gear pump 26 to maintain pressure in the return sides of the circuits of pumps 10 and 17.

A single resistance valve may be employed for this purpose but, in order to keep the two circuits independent of each other, the drive is shown provided with a resistance valve 30, which has its inlet connected to channel 14 intermediate the ends thereof and its outlet connected to one end of a channel 31, and a resistance valve 32 which has its inlet connected to the other end of channel 31 and its outlet connected to a drain channel 33 which discharges into base 24. Channel 31 is connected intermediate the ends thereof to channel 19 intermediate the ends thereof by a channel 34. Gear pump 26 is thus enabled to maintain in channel 14 a pressure equal to the combined resistances of valves 30 and 32 and to maintain in channel 19 a pressure equal to the resistance valve 32.

The motors 4 may be of any suitable type such as the rolling piston type shown in Patent No. 1,998,984. A hydrodynamic machine of this character has its pistons and cylinders arranged in a rotatable cylinder barrel 40 (Fig. 2) which is journaled upon a stationary valve shaft or pintle 41 through which liquid flows to and from the cylinders. The outer ends of the pistons engage an annular reaction surface 42 formed upon the inside of a slide block 43 in which cylinder barrel 40 is arranged.

When reaction surface 42 and cylinder barrel 40 are concentric with each other, motor displacement is zero and motor 4 will remain idle. When slide block 43 is shifted so that reaction surface 42 is eccentric to cylinder barrel 40, motor displacement will be proportional to the distance slide block 43 is shifted from its zero displacement position and motor 4 will operate when supplied with motive liquid. Since pumps and motors of this type are well known and in extensive commercial use, no further description thereof will be given.

Slide block 43 is urged toward a zero displacement position by a substantially constant force such as a spring or, as shown, by means of a piston 44 connected to slide block 43 and fitted in a stationary cylinder 45 which is ordinarily carried by the pump casing and to which liquid is supplied at a constant pressure by gear pump 26. To this end, each cylinder 45 is connected to a branch of channel 14 by a channel 46 so that a pressure equal to the combined resistances of valves 30 and 32 prevails in each cylinder 45 whenever the drive is in operation.

Slide block 43 of the motor 4 in each drive section is adapted to be moved toward maximum displacement position in response to variations in the drop in pressure across the motor 5 of the same section. For the purpose of illustration, each motor 4 is shown provided with an actuator 50 which has its casing connected to or formed integral with the casing of motor 4 and which is shown in detail in Fig. 2.

Actuator 50 is provided with a piston 51 which is connected to slide block 43 and adapted to be operated by liquid under the control of a valve 52 which is shown on a considerably enlarged scale in respect to the motor. Pistons 44 and 51 are also shown on an enlarged scale in respect to the motor.

Piston 51 is fitted in a cylinder 53 which is formed in the actuator casing and connected by a port 54 to a bore 55 which is formed in the actuator casing at right angles to cylinder 53 and has valve 52 arranged therein.

Valve 52 is provided with a central head or piston 56, which normally covers port 54, and two end heads or pistons 57 and 58 which are spaced from valve piston 56. All three of the valve pistons are closely fitted in bore 55 to reciprocate therein.

Liquid for operating piston 51 may be supplied to cylinder 53 from any suitable source such as from gear pump 26 by means of a channel 59 having one of its ends connected to channel 14 and its other end connected to the actuator casing in communication with bore 55 at a point which remains between valve pistons 56 and 57 in all positions of valve 52. Valve piston 56 controls communication between port 54 and channel 59 and also between port 54 and a drain channel 60 communicating with bore 55 at a point which always remains between pistons 56 and 58 in all positions of valve 52.

In order that valve 52 may be operated in response to variations in the drop in pressure across motor 5, the upper end of bore 55 is connected to the intake side of motor 5, the lower end of bore 55 is connected to the discharge side of motor 5, and valve 52 is urged upward by a spring 63 which is arranged in the lower end of bore 55 and has its tension adjusted by a screw 64. As shown, actuator 50 of section A has the upper end of its bore 55 connected to channel 18 by a channel 65 and the lower end thereof connected to channel 20 by a channel 66, actuator 50 of section B has the upper end of its bore 55 connected to channel 20 by a channel 67 and the lower end thereof connected to channel 21 by a channel 68, and actuator 50 of section C has the upper end of its bore 55 connected to channel 21 by a channel 69 and the lower end thereof connected to channel 19 by a channel 70.

The arrangement is such that the pressure prevailing at the intake of motor 5 and acting on valve piston 57 urges valve 52 downward against the upward forces exerted upon valve piston 58 by spring 63 and by the pressure prevailing at the outlet of motor 5. Spring 63 has its tension so adjusted that it will support valve 52 in such a position that valve piston 56 covers ports 54 when the pressure drop across motor 5 is normal. That is, with valve piston 56 in position to cover port 54, the force exerted by spring 63 is just equal to the difference between the forces exerted by the liquid upon valve pistons 57 and 58 when motor 5 is carrying its normal share of the load.

Since the motor 4 of each drive section is driven by liquid supplied thereto at a constant pressure, the force exerted by it will remain constant as long as its displacement remains constant. Therefore, any variation in the load on the drive section will cause a corresponding variation in the load on the motor 5 of that section with a resultant variation in the pressure of the liquid delivered to that motor 5 for the reason that liquid is delivered thereto at a constant volumetric rate.

If the load should increase, the pressure at the intake of motor 5 would increase and cause valve 52 to be depressed until port 54 was opened to channel 59. Then liquid from gear pump 26 would enter cylinder 53 and move slide block 43 toward the right and thereby increase motor displacement until motor 4 could carry enough of the additional load to reduce the load on motor 5 until the drop in pressure across motor 5 was reduced to normal. Then the forces exerted upon valve piston 58 by the liquid and by spring 63 would raise valve 52 until valve piston 56 covered port 54 and trapped the liquid in cylinder 53 to hold piston 51 and slide block 43 in their new positions.

If the load should decrease, the pressure at the intake of motor 5 would decrease and permit the forces exerted upon valve piston 58 by the liquid and by spring 63 to raise valve 52 until port 54 was opened to drain channel 60. Then liquid could escape from cylinder 53 and permit liquid from gear pump 26 to enter cylinder 45 and move piston 44 and slide block 43 toward the left and thereby decrease motor displacement until motor 4 would be carrying a smaller share of the load and causing the load on motor 5 to be increased until the drop in pressure across motor 5 would increase to normal. Then the increased pressure at the inlet of motor 5 would cause valve 52 to move downward until valve piston 56 covered port 54 and trapped the liquid in cylinder 53 to hold piston 51 and slide block 43 in their new positions.

Since it is sometimes desirable to operate one or more sections of the drive while one or more other sections remain idle, a bypass valve is connected across the helper motor of each section. As shown, a normally closed valve 73 is connected between channels 18 and 20, a similar valve 74 is connected between channels 20 and 21 and a similar valve 75 is connected between channels 21 and 19.

Assuming that the drive is idle, that it has but three sections, and that valves 73, 74, and 75 are closed, the drive will operate as follows:

When electric motor 25 is energized, it will drive pumps 10, 17, and 26 which will deliver liquid into channels 11, 18, and 29 respectively. Pump 10 will attempt to drive all of the motors 4 but cannot do so as they do not have sufficient power to drive machine units 1, 2, and 3 without the aid of motors 5. Also, some of the motors 4 will have reduced torque due to those motors having been adjusted to short stroke as will presently appear. Consequently, if the pressure in the circuit has dropped, pump 10 will deliver liquid at its full volumetric rate until pump pressure reaches the predetermined maximum and then it will reduce its displacement until it is delivering just sufficient liquid to maintain that maximum pressure substantially constant.

When motor 25 was previously deenergized to stop the apparatus, the inertia of the machine units 1, 2, and 3 drove or tended to drive the motors 4 and 5 and reversed the pressure in each circuit, thereby permitting springs 63 to raise valves 52 to open ports 54 to drain channels 60 so that when gear pump 26 was started, liquid discharged therefrom could enter the cylinder 45 in each of sections B and C and reduce the displacement of the motors 4 of those sections to minimum displacement.

Gear pump liquid would also tend to reduce the displacement of motor 4 in section A but, since the pumps are all started at the same time, pump 17 will deliver liquid to motor 5 of section A which will attempt to start machine unit 1 but cannot do so at first due to the static friction and inertia thereof. Consequently, pump 17 will raise a high pressure in channel 18 and this pressure will extend through channel 65 and move valve 52 downward to open port 54 to channel 59 so that gear pump liquid will enter cylinder 53 and move slide block 43 toward maximum displacement position, thereby causing motor 4 to exert a high torque which, together with the torque exerted by motor 5, is ample to start machine unit 1.

As soon as section A starts to operate, the liquid discharged from the motor 5 thereof will flow through channel 20 to motor 5 of section B and attempt to start it but cannot do so due to the static friction and inertia of machine unit 2. Consequently, the pressure in channel 20 will rise and liquid will flow through channel 67 to actuator 50 of section B and move its valve 52 downward, thereby permitting gear pump liquid to move slide block 43 toward maximum displacement position until motor 4 of section B is exerting a high torque which, together with the torque exerted by motor 5, is ample to start machine unit 2.

As soon as section B starts to operate, the liquid discharged from the motor 5 thereof will flow through channel 21 and cause section C to start machine unit 3 in the same manner that section B started machine unit 2. If the drive had more than three sections, the additional sections would be successively started in the same manner.

The displacement of pump 17 is preferably reduced, as by turning the hand wheel 22 thereof, before motor 25 is energized so that pump 17 when started will at first deliver liquid to motors 5 at a reduced rate and thereby cause the drive to operate at slow speed. After the drive has been started, it may be accelerated to the desired speed by increasing the displacement of pump 17. Since the several machine units are started successively and at slow speed, it is not necessary that electric motor 25 and pumps 10 and 17 have the power capacity that would be required if the units were started simultaneously as in the prior drives.

As soon as a unit is started, less torque is required and, as soon as it has been accelerated to its running speed, still less torque is required.

Since motor 4 is supplied with liquid at a substantially constant pressure, it exerts a substantially constant torque as long as its displacement remains unchanged. Consequently, any decrease in the required torque is first felt by motor 5 with a resultant drop in pressure at its inlet. This drop in pressure at the inlet of motor 5 causes actuator 50 to operate and effect a decrease in the displacement of motor 4 in the previously described manner until each of motors 4 and 5 is carrying its predetermined share of the load as determined by the adjustment of spring 63.

If the ratios of drives 6 and 7 and the displacement of motor 5 in one section are exactly the same, respectively, as the ratios of drives 6 and 7 and the displacement of motor 5 in each of the other sections, all of the machine units will be driven at the same speed for the reason that motors 5 are connected in series and must operate at the same speed, any variation in load which might cause a variation in the speed of any unit being compensated for by adjustment of motor 4 as previously explained.

If it is desired to increase or to decrease the overall speed of the drive, the displacement of pump 17 may be increased or decreased. If it is desired to vary the speed of one unit relative to the speed of another unit for the purpose, for example, of compensating for the stretching or shrinking of the material being processed by the several units, it is simply necessary to vary the displacement of motor 5 of that section as by adjusting hand wheel 22. If the displacement of motor 5 of one section is decreased, the speed of the unit driven by that section will be increased and, conversely, if its displacement is increased the speed of the unit will be decreased for the reason that pump 17 delivers liquid to motor 5 at a constant volumetric rate.

When the drive is stopped, as by deenergizing electric motor 25, the machine units driven by the drive may have sufficient inertia to drive motors 4 and 5, thereby causing motors 4 and 5 to function as pumps and tend to drive pumps 10 and 17 and electric motor 25 the resistance of which would cause a reversal of pressure in the circuit.

If the machine should drive motors 4 and 5 and no preventative means were provided, motors 4 and 5 would discharge through resistance valves 30 and 32 and thereby cause a deficiency of liquid in the circuit unless the resistance valves were adjusted to open at a pressure higher than the pressure required to drive pumps 10 and 17.

In order to prevent such a deficiency of liquid and to avoid the necessity of maintaining a relatively high pressure in the return side of each circuit, there may be provided between channels 18 and 19 a resistance valve 76 which is adjusted to open at a pressure lower than the pressure required to open resistance valve 32, and between channels 12 and 14 a resistance valve 77 which is adjusted to open at a pressure lower than the pressure required to overcome the combined resistances of valves 30 and 32. Valves 76 and 77 would permit liquid to flow from channel 19 to channel 18 and from channel 14 into channel 12 but would prevent it from flowing in the opposite direction.

Then when motors 4 and 5 were driven by the machine units, the liquid discharged by motor 5 of section C would flow through channel 19, resistance valve 76 and channel 18 to motor 5 of section A. Resistance valve 76 would function as a brake to decelerate the machine units and would cause pressure to be created in channels 19, 21, and 20 and this pressure would extend into the lower ends of actuators 50 and raise the valves 52 thereof to open each cylinder 53 to drain pipe 60.

The liquid discharged by motors 4 would flow from channel 14 into channel 12 through resistance valve 77 which would cause pressure to be maintained in channel 14 and this pressure would extend through channels 46 into cylinders 45 and cause pistons 44 to move slide blocks 43 toward the left until motors 4 were at zero displacement or, if desired, to a predetermined minimum displacement in which case resistance valve 77 would also function as a brake to decelerate the machine units.

The invention herein set forth is susceptible of various modifications and adaptations without departing from the scope thereof as hereafter claimed.

The invention is hereby claimed as follows:

1. A sectional drive, comprising a series of drive sections each including a variable displacement hydraulic main motor and a hydraulic helper motor mechanically connected to each other, means for supplying motive liquid to said main motors at a pressure not exceeding a predetermined maximum, a pump for supplying motive liquid to said helper motors, fluid channels connecting said helper motors to said pump in series with each other, and means responsive to variations in the drop in pressure across each helper motor for varying the displacement of the main motor connected thereto.

2. A sectional drive, comprising a series of drive sections each including a variable displacement hydraulic main motor and a hydraulic helper motor mechanically connected to each other, means for supplying motive liquid to said main motors at a pressure not exceeding a predetermined maximum, a pump for supplying motive liquid to said helper motors, fluid channels connecting said helper motors to said pump in series with each other, means responsive to variations in the drop in pressure across each helper motor for varying the displacement of the main motor connected thereto, and means for varying the displacement of at least one helper motor to thereby vary the speed of the drive section containing that motor relative to the speeds of other drive sections.

3. A sectional drive, comprising a series of drive sections each including a variable displacement hydraulic main motor and a hydraulic helper motor mechanically connected to each other, means for supplying motive liquid to said main motors at a pressure not exceeding a predetermined maximum, a pump for supplying motive liquid to said helper motors, fluid channels connecting said helper motors to said pump in series with each other, means responsive to variations in the drop in pressure across each helper motor for varying the displacement of the main motor connected thereto, and means for varying the displacement of said pump to thereby vary the speeds of all of said drive sections.

4. A sectional drive, comprising a series of drive sections each including a variable displacement hydraulic main motor and a hydraulic helper motor mechanically connected to each other, means for supplying motive liquid to said main motors at a pressure not exceeding a predetermined maximum, a pump for supplying motive liquid to said helper motors, fluid channels connecting said helper motors to said pump in series with each other, means responsive to variations in the drop in pressure across each helper motor for varying the displacement of the main motor connected thereto, means for varying the displacement of at least one helper motor to thereby vary the speed of the drive section containing that motor relative to the speeds of other drive sections, and means for varying the displacement of said pump to thereby vary the speeds of all of said drive sections.

5. A sectional drive for a series of machine units, comprising a drive section for driving each unit and including a variable displacement hydraulic main motor and a hydraulic helper motor mechanically connected to each other and to said unit, means for supplying motive liquid to said main motors at a pressure not exceeding a predetermined maximum, each of said main motors when supplied with motive liquid at or below said maximum pressure having insufficient power to drive the unit to which it is connected, a pump for supplying motive liquid to said helper motors, fluid channels connecting said helper motors to said pump in series with each other, and means responsive to variations in the drop in pressure across each helper motor for varying the displacement of the main motor connected thereto.

6. A sectional drive for a series of machine units, comprising a drive section for driving each unit and including a variable displacement hydraulic main motor and a hydraulic helper motor mechanically connected to each other and to said unit, means for supplying motive liquid to said main motors at a pressure not exceeding a predetermined maximum, each of said main motors when supplied with motive liquid at or below said maximum pressure having insufficient power to drive the unit to which it is connected, a pump for supplying motive liquid to said helper motors, fluid channels connecting said helper motors to said pump in series with each other, means responsive to variations in the drop in pressure across each helper motor for varying the displacement of the main motor connected thereto, and means for varying the displacement of at least one helper motor to thereby vary the speed of the drive section containing that motor relative to the speeds of other drive sections.

7. A sectional drive for a series of machine units, comprising a drive section for driving each unit and including a variable displacement hydraulic main motor and a hydraulic helper motor mechanically connected to each other and to said unit, means for supplying motive liquid to said main motors at a pressure not exceeding a predetermined maximum, each of said main motors when supplied with motive liquid at or below said maximum pressure having insufficient power to drive the unit to which it is connected, a pump for supplying motive liquid to said helper motors, fluid channels connecting said helper motors to said pump in series with each other, means responsive to variations in the drop in pressure across each helper motor for varying the displacement of the main motor connected thereto, and means for varying the displacement of said pump to thereby vary the speeds of all of said drive sections.

8. A sectional drive for a series of machine units, comprising a drive section for driving each unit and including a variable displacement hydraulic main motor and a hydraulic helper motor mechanically connected to each other and to said unit, means for supplying motive liquid to said main motors at a pressure not exceeding a predetermined maximum, each of said main motors when supplied with motive liquid at or below said maximum pressure having insufficient power to drive the unit to which it is connected, a pump for supplying motive liquid to said helper motors, fluid channels connecting said helper motors to said pump in series with each other, means responsive to variations in the drop in pressure across each helper motor for varying the displacement of the main motor connected thereto, means for varying the displacement of at least one helper motor to thereby vary the speed of the drive section containing that motor relative to the speeds of other drive sections, and means for varying the displacement of said pump to thereby vary the speeds of all of said drive sections.

9. A sectional drive for a series of machine units, comprising a drive section for driving each unit and including a variable displacement hydraulic main motor and a hydraulic helper motor mechanically connected to each other and to said unit, a constant pressure pump, fluid channels connecting all of said main motors to said pump in parallel with each other, a second pump, fluid channels connecting said helper motors to said second pump in series with each other, and means responsive to variations in the drop in pressure across each helper motor for varying the displacement of the main motor connected thereto.

10. A sectional drive for a series of machine units, comprising a drive section for driving each unit and including a variable displacement hydraulic main motor and a hydraulic helper motor mechanically connected to each other and to said unit, a constant pressure pump, fluid channels connecting all of said main motors to said pump in parallel with each other, a second pump, fluid channels connecting said helper motors to said second pump in series with each other, means responsive to variations in the drop in pressure across each helper motor for varying the displacement of the main motor connected thereto, and means for varying the displacement of each helper motor to thereby vary the speeds of said drive sections relative to each other.

11. A sectional drive for a series of machine units, comprising a drive section for driving each unit and including a variable displacement hydraulic main motor and a hydraulic helper motor mechanically connected to each other and to said unit, a constant pressure pump, fluid channels connecting all of said main motors to said pump in parallel with each other, a second pump, fluid channels connecting said helper motors to said second pump in series with each other, means responsive to variations in the drop in pressure across each helper motor for varying the displacement of the main motor connected thereto, and means for varying the displacement of said second pump to thereby vary the speeds of all of said drive sections.

12. A sectional drive for a series of machine units, comprising a drive section for driving each unit and including a variable displacement hydraulic main motor and a hydraulic helper motor mechanically connected to each other and to said unit, a constant pressure pump, fluid channels connecting all of said main motors to said pump in parallel with each other, a second pump, fluid channels connecting said helper motors to said second pump in series with each other, means responsive to variations in the drop in pressure across each helper motor for varying the displacement of the main motor connected thereto, means for varying the displacement of each helper motor to thereby vary the speeds of said drive sections relative to each other, and means for varying the displacement of said second pump to thereby vary the speeds of all of said drive sections.

13. In a hydraulic drive, the combination of a main hydraulic motor having an element shiftable to vary motor displacement, means for exerting a substantially constant force upon said element to urge it toward zero displacement position, displacement varying means for moving said element in the opposite direction against said force, a helper motor mechanically connected to said main motor to assist it in driving a load, means for supplying motive liquid to each of said motors to drive the same, and means responsive to variations in the drop in pressure across said helper motor for operating said displacement varying means.

14. In a hydraulic drive, the combination of a main hydraulic motor having an element shiftable to vary motor displacement, means for exerting a substantially constant force upon said element to urge it toward zero displacement position, displacement varying means for moving said element in the opposite direction against said force, a helper motor mechanically connected to said main motor to assist it in driving a load, a constant pressure pump for supplying liquid to said main motor to drive the same, a volumetric pump for supplying liquid to said helper motor at a measured rate, and means responsive to variations in the drop in pressure across said helper motor for operating said displacement varying means.

15. In a hydraulic drive, the combination of a main hydraulic motor having an element shiftable to vary motor displacement, means for exerting a substantially constant force upon said element to urge it toward zero displacement position, displacement varying means for moving said element in the opposite direction against said force, a helper motor mechanically connected to said main motor to assist it in driving a load, a constant pressure pump for supplying liquid to said main motor to drive the same, a volumetric pump for supplying liquid to said helper motor at a measured rate, means responsive to variations in the drop in pressure across said helper motor for operating said displacement varying means, and means for varying the displacement of said volumetric pump to thereby vary the speeds of said motors.

16. In a hydraulic drive, the combination of a main hydraulic motor having an element shiftable to vary motor displacement, means for exerting a substantially constant force upon said element to urge it toward zero displacement position, displacement varying means for moving said element in the opposite direction against said force, a helper motor mechanically connected to said main motor to assist it in driving a load, a constant pressure pump for supplying liquid to said main motor to drive the same, a volumetric pump for supplying liquid to said helper motor at a measured rate, means responsive to variations in the drop in pressure across said helper motor for operating said displacement varying means, and means for varying the displacement of said helper motor to thereby vary its speed and the speed of said main motor.

17. In a hydraulic drive, the combination of a main hydraulic motor having an element shiftable to vary motor displacement, means for exerting a substantially constant force upon said element to urge it toward zero displacement position, displacement varying means for moving said element in the opposite direction against said force, a helper motor mechanically connected to said main motor to assist it in driving a load, a constant pressure pump for supplying liquid to said main motor to drive the same, a volumetric pump for supplying liquid to said helper motor at a measured rate, means responsive to variations in the drop in pressure across said helper motor for operating said displacement varying means, means for varying the displacement of said volumetric pump to thereby vary the speeds of said motors, and means for varying the displacement of said helper motor to thereby further vary its speed and the speed of said main motor.

PAUL SIMONDS.